US011252387B2

United States Patent
Sugama

(10) Patent No.: US 11,252,387 B2
(45) Date of Patent: Feb. 15, 2022

(54) PROJECTION APPARATUS, PROJECTION METHOD AND STORAGE MEDIUM

(71) Applicant: CASIO COMPUTER CO., LTD., Tokyo (JP)

(72) Inventor: Kosuke Sugama, Tokyo (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 294 days.

(21) Appl. No.: 16/458,798

(22) Filed: Jul. 1, 2019

(65) Prior Publication Data
US 2020/0007831 A1 Jan. 2, 2020

(30) Foreign Application Priority Data
Jul. 2, 2018 (JP) .............................. JP2018-125873

(51) Int. Cl.
| | |
|---|---|
| H04N 9/31 | (2006.01) |
| G06F 3/01 | (2006.01) |
| G06F 3/03 | (2006.01) |
| G03B 21/14 | (2006.01) |
| G06F 3/0487 | (2013.01) |
| G02B 13/16 | (2006.01) |
| G06F 1/16 | (2006.01) |

(52) U.S. Cl.
CPC ........... *H04N 9/3173* (2013.01); *G02B 13/16* (2013.01); *G03B 21/145* (2013.01); *G06F 1/163* (2013.01); *G06F 3/017* (2013.01); *G06F 3/0304* (2013.01); *G06F 3/0487* (2013.01)

(58) Field of Classification Search
CPC ....... G03B 21/145; G02B 13/16; G06F 3/017; G06F 3/0304; G06F 3/0487; H04N 9/3173
USPC ......................................................... 353/119
See application file for complete search history.

(56) References Cited

U.S. PATENT DOCUMENTS

| | | | |
|---|---|---|---|
| 10,514,256 B1* | 12/2019 | Kamarshi | ................ G01C 3/08 |
| 2010/0091098 A1 | 4/2010 | Yoshifuji et al. | |
| 2012/0075534 A1 | 3/2012 | Katz et al. | |
| 2012/0256824 A1 | 10/2012 | Mizunuma et al. | |
| 2015/0185859 A1 | 7/2015 | Yamamoto et al. | |

(Continued)

FOREIGN PATENT DOCUMENTS

| | | |
|---|---|---|
| CN | 102510461 A | 6/2012 |
| CN | 104750243 A | 7/2015 |

(Continued)

OTHER PUBLICATIONS

Translation of JP2017223842A (Year: 2021).*

(Continued)

*Primary Examiner* — Jerry L Brooks
(74) *Attorney, Agent, or Firm* — Fitch, Even, Tabin & Flannery LLP

(57) ABSTRACT

There is provided a projection apparatus which includes a projection unit configured to project an image, an acquisition device configured to acquire a distance between an apparatus main body and a projection target, a ranging device including a ranging axis which is substantially parallel to a projection optical axis of the projection unit, and a controller configured to control a projection operation, based on a result of ranging of the ranging device with reference to the distance acquired by the acquisition device.

10 Claims, 10 Drawing Sheets

(56) References Cited

U.S. PATENT DOCUMENTS

| | | | |
|---|---|---|---|
| 2016/0139674 A1* | 5/2016 | Watanabe | G06F 3/0425 |
| | | | 345/156 |
| 2016/0259486 A1 | 9/2016 | Fujimori | |
| 2016/0274677 A1 | 9/2016 | Liu | |
| 2017/0244943 A1 | 8/2017 | Saito et al. | |

FOREIGN PATENT DOCUMENTS

| | | | | |
|---|---|---|---|---|
| CN | 105607734 | A | 5/2016 | |
| CN | 105938410 | A | 9/2016 | |
| CN | 106033245 | A | 10/2016 | |
| CN | 106033257 | A | 10/2016 | |
| CN | 106897688 | A | 6/2017 | |
| CN | 107102804 | A | 8/2017 | |
| CN | 107197223 | A | 9/2017 | |
| CN | 108200419 | A | 6/2018 | |
| JP | 2010098479 | A | 4/2010 | |
| JP | 2011-175051 | A | 9/2011 | |
| JP | 2012208439 | A | 10/2012 | |
| JP | 2015125670 | A | 7/2015 | |
| JP | 2015-210684 | A | 11/2015 | |
| JP | 2016-012203 | A | 1/2016 | |
| JP | 2017-40840 | A | 2/2017 | |
| JP | 2017-223842 | A | 12/2017 | |
| JP | 2017223842 | A * | 12/2017 | G03B 21/14 |
| WO | 2016/035231 | A1 | 3/2016 | |

OTHER PUBLICATIONS

JPO; Application No. 2018-125873; Notice of Reasons for Refusal dated Aug. 25, 2020.

CNIPA; Application No. 201910584654.6; Office Action dated Mar. 11, 2021.

* cited by examiner

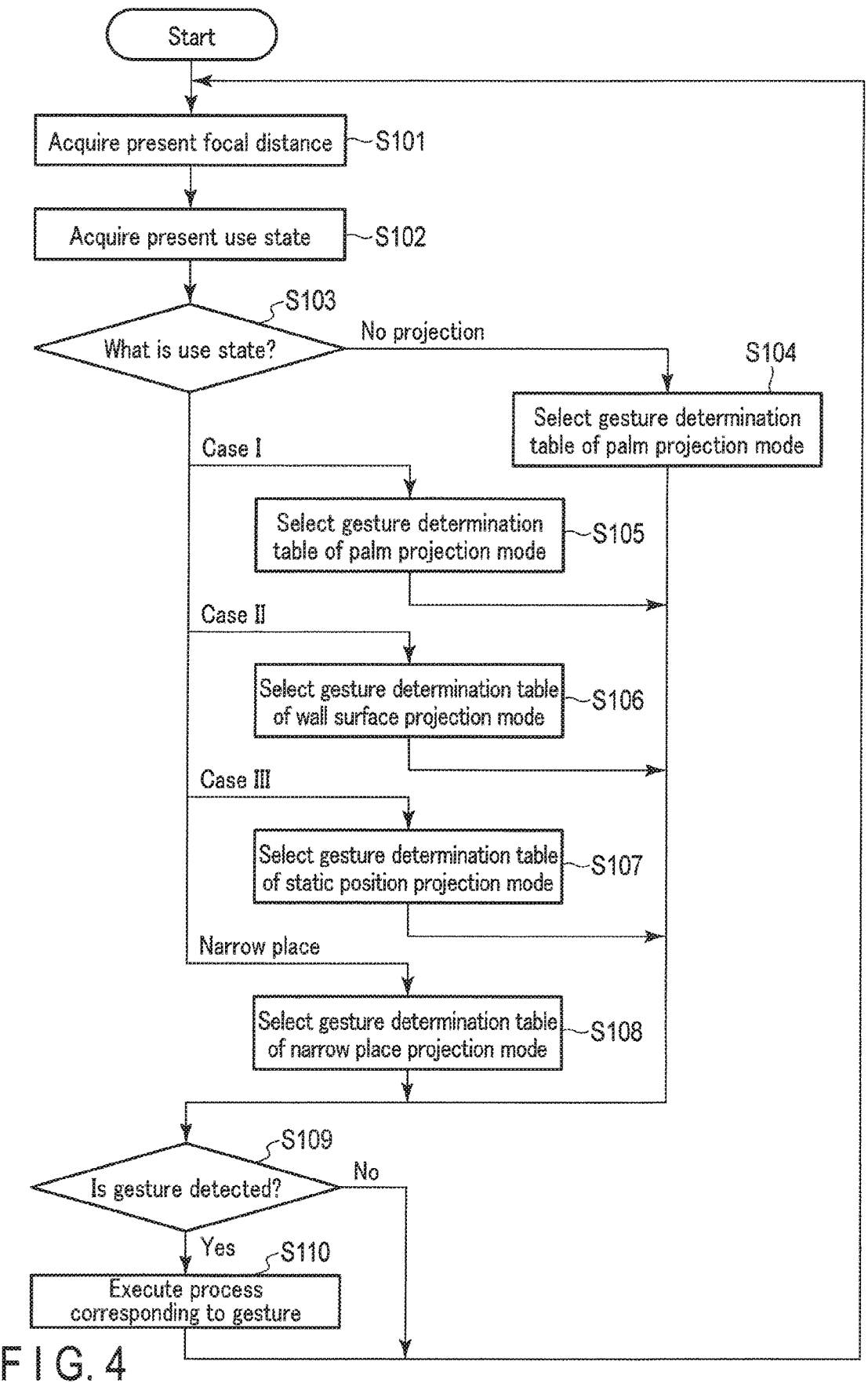
F I G. 4

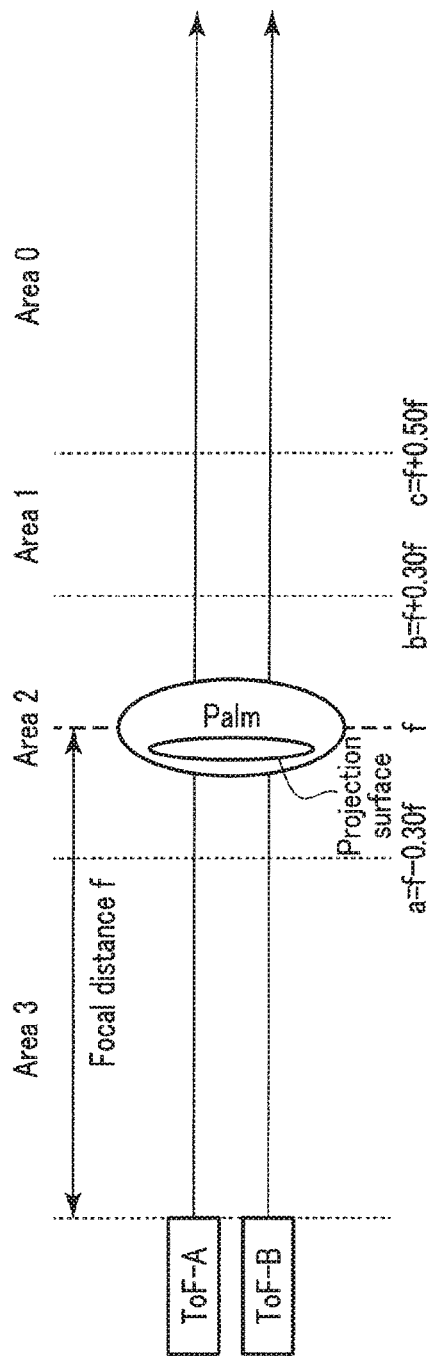

FIG. 6A

| Gesture | Hand position transition state (ToF-A, ToF-B) N=1~3 | | Details of hand movement |
|---|---|---|---|
| ①Out | (N,N) | (0,N)/(N,0)/(0,0) | Movement to outside from vicinity of focal point |
| | (0,N)/(N,0) | (0,0) | |
| ②Down | (0,N) | (N,N) | Move down hand near focal point and then move back hand |
| ③Up | (N,0) | (N,N) | Move up hand near focal point and then move back hand |
| ④Near | (2,2)/(2,3)/(3,2) | (3,3) | Move hand toward main body from vicinity of focal point |
| ⑤Far | (2,2)/(2,1)/(1,2) | (1,1) | Move hand away from vicinity of focal point |
| ⑥Set | (0,0) | (N,N) | Position hand over vicinity of focal point |
| ⑦Clear | (0,0) | Passage of 3 seconds in state of (0,0) | Absence of hand in position of N (1~3) for 3 seconds or more |

FIG. 6B

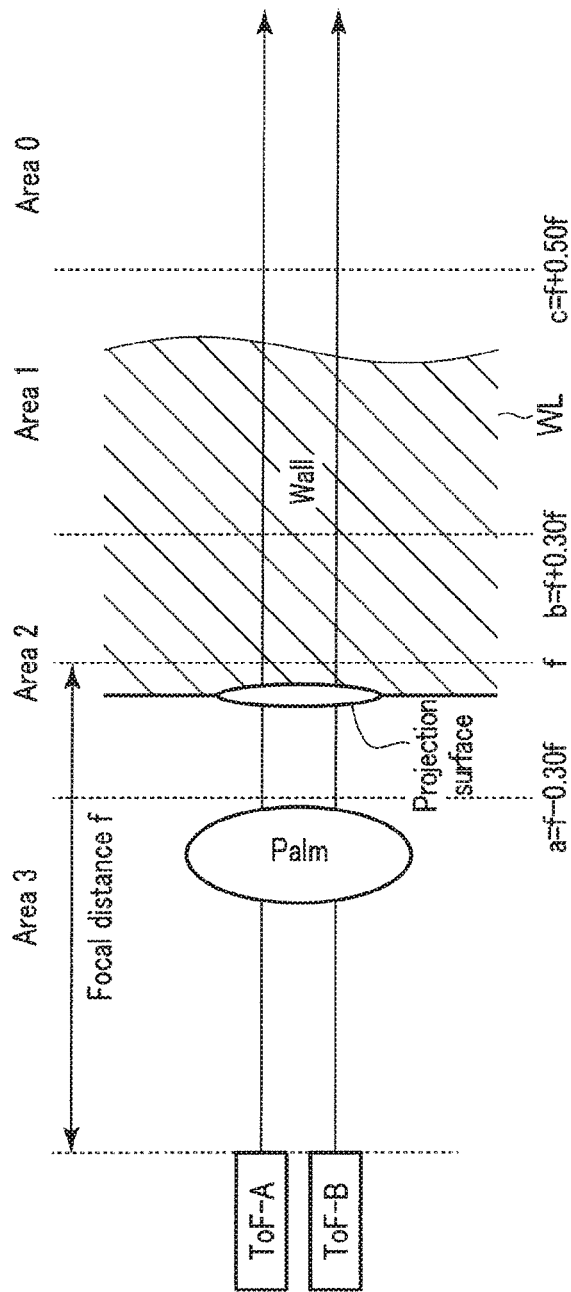
F I G. 7

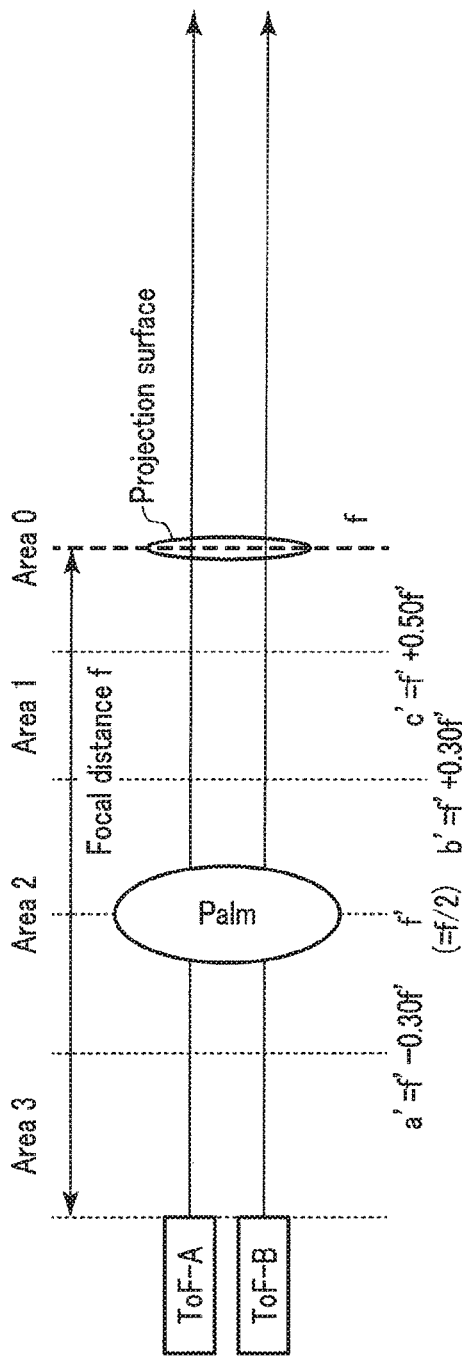

FIG. 8A

| Gesture | Hand position transition state (ToF-A, ToF-B) N=1~3 | | Details of hand movement |
|---|---|---|---|
| ①Out | (N,N) | ⇨ (0,N)/(N,0)/(0,0) | Movement to outside from vicinity of focal point |
| ②Down | (0,N)/(N,0) | ⇨ (0,0) | Move down hand near focal point and then move back hand |
| ③Up | (0,N) | ⇨ (N,N) | Move up hand near focal point and then move back hand |
| | (N,0) | ⇨ (N,N) | |
| ④Near | (2,2)/(2,3)/(3,2) | ⇨ (3,3) | Move hand toward main body from vicinity of focal point |
| ⑤Far | (2,2)/(2,1)/(1,2) | ⇨ (1,1) | Move hand away from vicinity of focal point |
| ⑥Set | (0,0) | ⇨ (N,N) | Position hand over vicinity of focal point |
| ⑦Clear | (0,0) Passage of 3 seconds in state of (0,0) | | Absence of hand in position of N (1~3) for 3 seconds or more |

FIG. 8B

| Gesture | Hand position transition state (ToF-A, ToF-B) N=1~3 | | | Details of hand movement |
|---|---|---|---|---|
| ①Out | (N,N) | ⇨ | (0,N)/(N,0)/(0,0) | Movement to outside from vicinity of focal point |
| | (0,N)/(N,0) | ⇨ | (0,0) | |
| ②Down | (0,N) | ⇨ | (N,N) | Move down hand near focal point and then move back hand |
| ③Up | (N,0) | ⇨ | (N,N) | Move up hand near focal point and then move back hand |
| ④Near | (2,2)/(2,3)/(3,2) | ⇨ | (3,3) | Move hand toward main body from vicinity of focal point |
| ⑤Far | (2,2)/(2,1)/(1,2) | ⇨ | (1,1) | Move hand away from vicinity of focal point |
| ⑥Set | (0,0) | ⇨ | (N,N) | Position hand over vicinity of focal point |
| ⑦Clear | (0,0) | ⇨ | Passage of 3 seconds in state of (0,0) | Absence of hand in position of N (1~3) for 3 seconds or more |
| ⑧Tilt-1 | Inclination (absolute value) Less than 45° | ⇨ | Inclination (absolute value) 45° or more | Movement of forward inclination |
| ⑨Tilt-2 | Inclination (absolute value) Less than 45° | ⇨ | Inclination (absolute value) 45° or more | Movement of backward inclination |

F I G. 9A

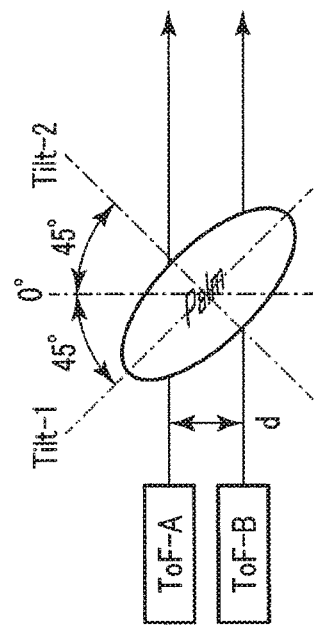

F I G. 9B

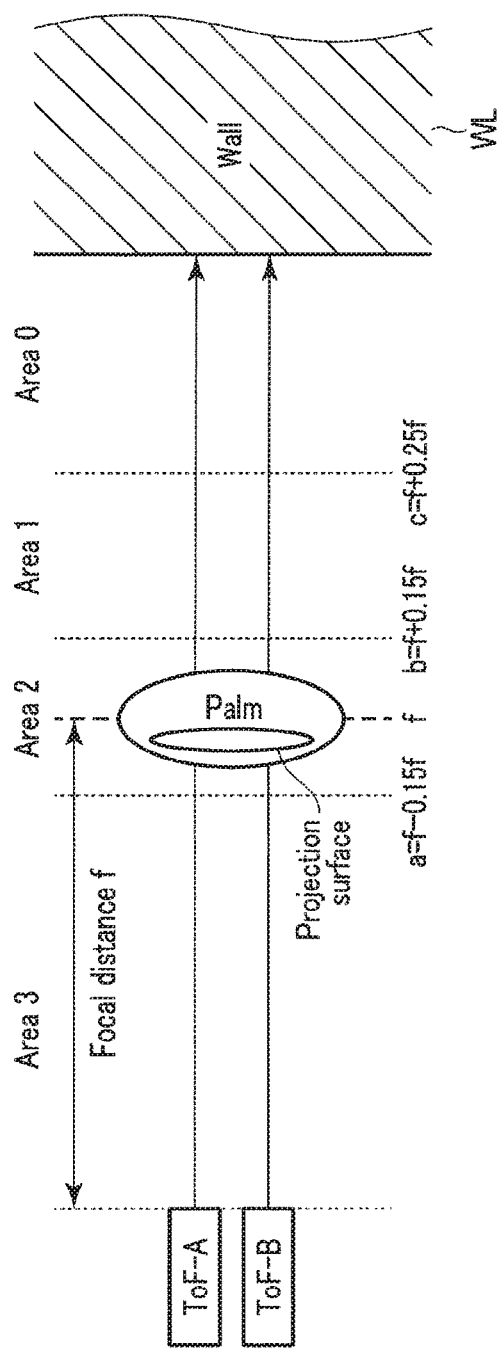

FIG. 10A

| Gesture | Hand position transition state (ToF-A, ToF-B) N=1~3 | | Details of hand movement |
|---|---|---|---|
| ①Out | (N,N) | ⇨ (0,N)/(N,0)/(0,0) | Movement to outside from vicinity of focal point |
| ②Down | (0,N)/(N,0) | ⇨ (0,N) | Move down hand near focal point and then move back hand |
| ③Up | (N,0) | ⇨ (N,N) | Move up hand near focal point and then move back hand |
| ④Near | (2,2)/(2,3)/(3,2) | ⇨ (3,3) | Move hand toward main body from vicinity of focal point |
| ⑤Far | (2,2)/(2,1)/(1,2) | ⇨ (1,1) | Move hand away from vicinity of focal point |
| ⑥Set | (0,0) | ⇨ (N,N) | Position hand over vicinity of focal point |
| ⑦Clear | (0,0) | ⇨ Passage of 3 seconds in state of (0,0) | Absence of hand in position of N (1~3) for 3 seconds or more |

FIG. 10B

PROJECTION APPARATUS, PROJECTION METHOD AND STORAGE MEDIUM

CROSS-REFERENCE TO RELATED APPLICATIONS

This application is based upon and claims the benefit of priority from Japanese Patent Application No. 2018-125873, filed Jul. 2, 2018, the entire contents of which are incorporated herein by reference.

BACKGROUND OF THE INVENTION

1. Field of the Invention

The present invention relates to a projection apparatus which is suitable for, in particular, a wearable small-sized projector, a projection method, and a storage medium.

2. Description of the Related Art

Jpn. Pat. Appin. KOKAI Publication No. 2011-175051 proposes a technology for providing a small-sized projector which can project an image, without operation buttons being disposed on a projector main body. For example, it is presupposed that the projector is installed on a table, a desk or the like, and an image is projected onto a surface on which the projector is disposed. Thus, the movement of the apparatus operated on the surface is detected, and a process corresponding to an operation is executed based on a detection result.

On the other hand, in recent years, various kinds of mobile projectors, which are very small in size and can easily be carried, have been commercialized. A mobile projector of such a kind is driven by a battery, and is worn on, for example, a breast pocket of a person. Thereby, an image can be projected on the person's palm that is positioned in front of the person's chest.

In this kind of mobile projector, since the apparatus body is small, even if the apparatus main body is equipped with a plurality of buttons for performing various operations relating to projection, such operations are time-consuming and cumbersome. In particular, it is very difficult to operate buttons without causing disturbance of images which are projected during a projection operation.

To cope with this problem, it is conceivable to adopt a method of using a remote controller which is separate from the projector, or a method in which a member of an imaging system having such an imaging view angle as to cover a projection view angle is also provided on a projection surface, and a movement for instructing an operation by the palm, on which an image is projected, is recognized from an image captured by the member.

However, the above-described former method of using the separate remote controller may become a factor that impairs the ease in carrying the small-sized mobile projector itself.

In addition, the above-described latter method, in which the member of the imaging system is provided along with the projection system and the member is caused to recognize the movement of the palm for instructing the operation, requires complex hardware circuitry including a solid-state imaging device and an imaging lens optical system, and is not practical in consideration of factors including the manufacture cost of the mobile projector, power consumption, etc.

The present invention has been made in consideration of the above-described circumstance, and the object of the invention is to provide a projection apparatus which can realize, with simple configuration, various operations relating to a projection operation, a projection method, and a storage medium.

SUMMARY OF THE INVENTION

According to one aspect of the present invention, there is provided a projection apparatus comprising: a projection unit configured to project an image; an acquisition device configured to acquire a distance between an apparatus main body and a projection target; a ranging device including a ranging axis which is substantially parallel to a projection optical axis of the projection unit; and a controller configured to control a projection operation, based on a result of ranging of the ranging device with reference to the distance acquired by the acquisition device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a flowchart illustrating the processing content corresponding to a user's gesture operation according to the embodiment of the invention;

FIG. 6A and FIG. 6B are views for describing a projection environment and a gesture determination content in a "palm projection mode" according to the embodiment of the invention;

FIG. 7 is a view for describing a projection environment in a "wall surface projection mode" according to the embodiment of the invention;

FIG. 8A and FIG. 8B are views for describing a projection environment and a gesture determination content in the "wall surface projection mode" according to the embodiment of the invention;

FIG. 9A and FIG. 9B are views for describing a gesture determination content in a "static position projection mode" according to the embodiment of the invention; and FIG. 10A and FIG. 10B are views for describing a projection environment and a gesture determination content in a "narrow place mode" according to the embodiment of the invention.

DETAILED DESCRIPTION OF THE INVENTION

Hereinafter, an embodiment in a case in which the present invention is applied to a wearable-type small-sized mobile projector will be described in detail with reference to the accompanying drawings.

Figure 1A:
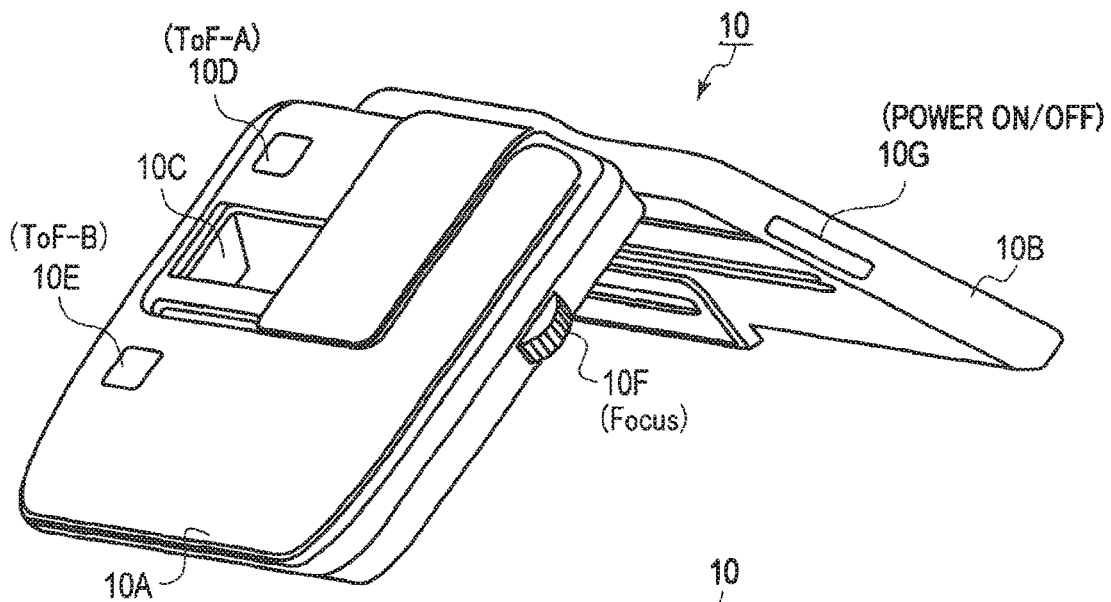
FIG. 1A, FIG. 1B and FIG. 1C are views illustrating an external appearance configuration and a wearing method of a small-sized mobile projector apparatus according to an embodiment of the present invention.
Figure 1B:
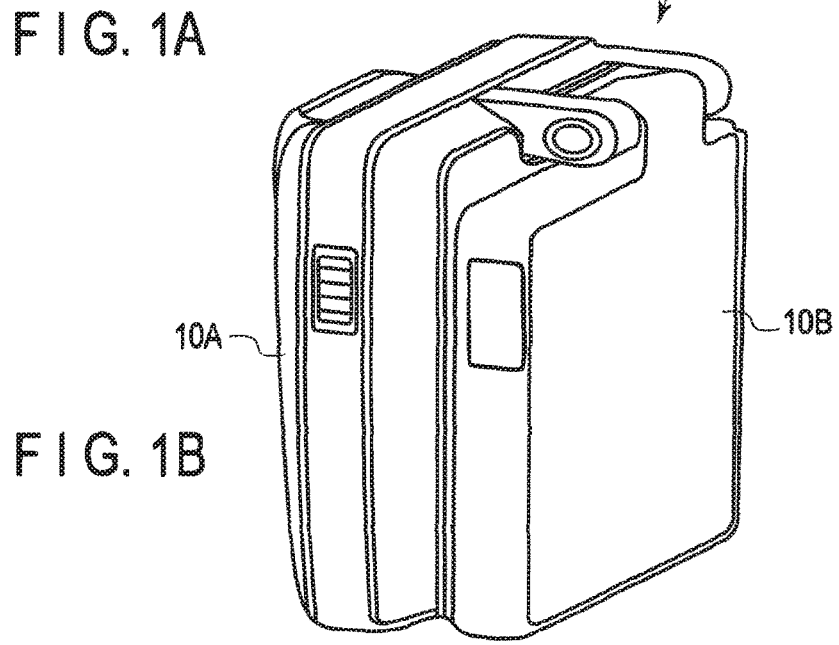
Figure 1C:
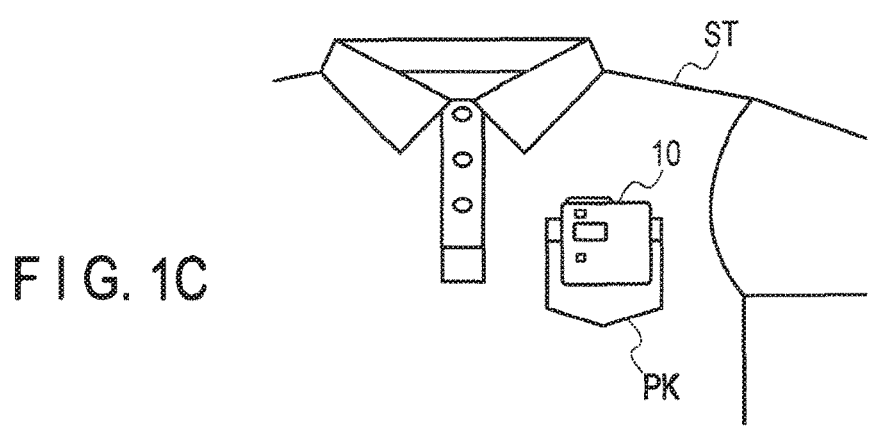

FIG. 1A, FIG. 1B and FIG. 1C are views illustrating an external appearance configuration and an example of wearing of a small-sized mobile projector 10 according to the present embodiment. As illustrated in FIG. 1A, the small-sized mobile projector 10 has a two-fold configuration in which a housing 10A and a housing 10B are openably/closably connected via a hinge. On the outer surface of the housing 10A, a projection lens unit 10C is disposed, and also two ToF sensors 10D (ToF-A) and 10E (ToF-B) are disposed with the projection lens unit 10C being interposed.

The projection lens unit 10C emits, in a direction perpendicular to the plate surface of the housing 10A, an optical image formed by a light source, which is composed of a semiconductor light-emitting element (not shown) in the inside of the projection lens unit 10C, and by a micromirror element which is a display element in the inside of the projection lens unit 10C, thereby projecting the image on a target on which the image is to be projected.

Each of the ToF sensors 10D and 10E is a sensor which emits an invisible laser beam of a very small output in an axial direction parallel to a projection optical axis of the projection lens unit 10C, and measure a distance from an external object existing in the axial direction, based on a time difference between the emission timing of the beam and the reception timing of the reflected beam.

By taking into account the detection outputs of the two ToF sensors 10D and 10E and the direction of arrangement of the ToF sensors 10D and 10E, the movement of the external object along the direction of arrangement can be detected.

In addition, a focus dial 10F for adjusting the focal distance of the projection lens unit 10C is provided on a side surface of the housing 10A. By detecting a subject distance corresponding to the lens position of a manual focus lens (acquisition device) in the projection lens unit 10C, the distance between the small-sized mobile projector 10 (apparatus main body) and the projection target can be acquired. A power key 10G for instructing ON/OFF of power is provided on a side surface of the other housing 10B.

FIG. 1B illustrates the external appearance of the small-sized mobile projector 10 in the state in which the housings 10A and 10B are folded.

FIG. 1C exemplarily illustrates a state in which the small-sized mobile projector 10 is worn on a breast pocket PK of a shirt ST. The breast pocket PK is clamped by the housing 10A and housing 10B, and the small-sized mobile projector 10 is worn so as to face the front size of the user wearing the shirt ST, with the housing 10A being located on the outside of the breast pocket PK. Thereby, the small-sized mobile projector 10 is set in the projection state.

Figure 2A:
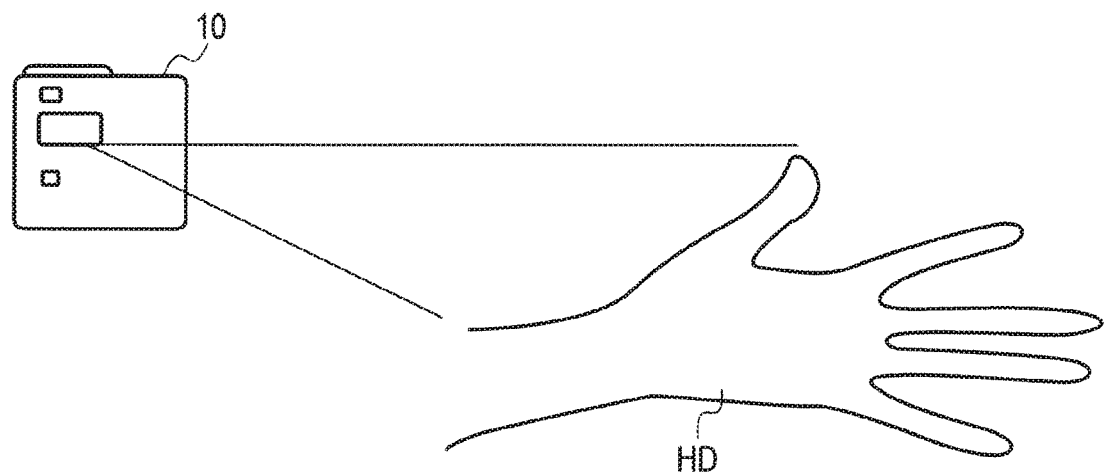
FIG. 2A and FIG. 2B are views illustrating the outline of a basic gesture operation according to the embodiment of the invention.

FIG. 2A exemplarily illustrates a state in which an image is projected on a hand HD of the user from the small-sized mobile projector 10 which is worn as illustrated in FIG. 1C.

Figure 2B:
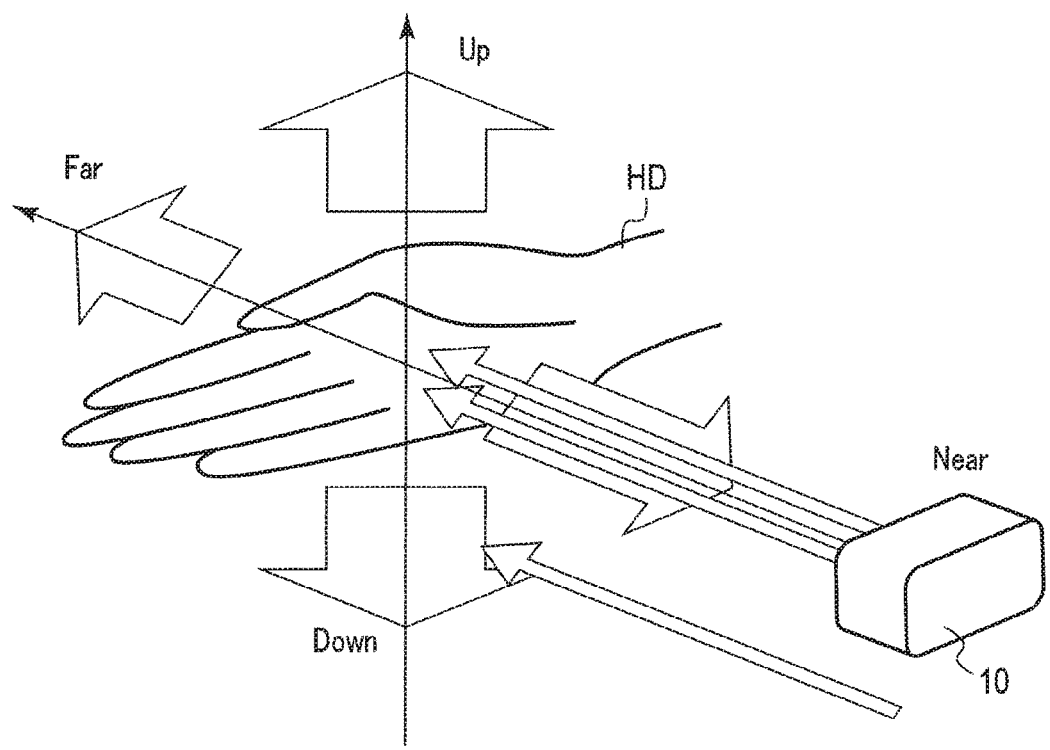

In addition, as illustrated in FIG. 2B, in the small-sized mobile projector 10 in the present embodiment, hand gestures by the user's hand HD are accepted as basic operation instructions, based on the detection outputs of the ToF sensors 10D and 10E.

Specifically, it is assumed that four movements can be accepted as operation instructions, in four cases where the user's hand HD is moved toward the small-sized mobile projector 10 (Near), moved away from the small-sized mobile projector 10 (Far), raised relative to the small-sized mobile projector 10 (Up), and lowered relative to the small-sized mobile projector 10 (Down).

Of these four cases, as regards the case of raising (Up) and the case of lowering (Down), the direction of raising/lowering of the user's hand HD is determined when the distance of one of the detection results of the ToF sensors 10D and 10E becomes sharply greater (Large) than the distance of the other detection result by the movement of the user's hand HD in the direction of arrangement of the ToF sensors 10D and 10E.

Figure 3:
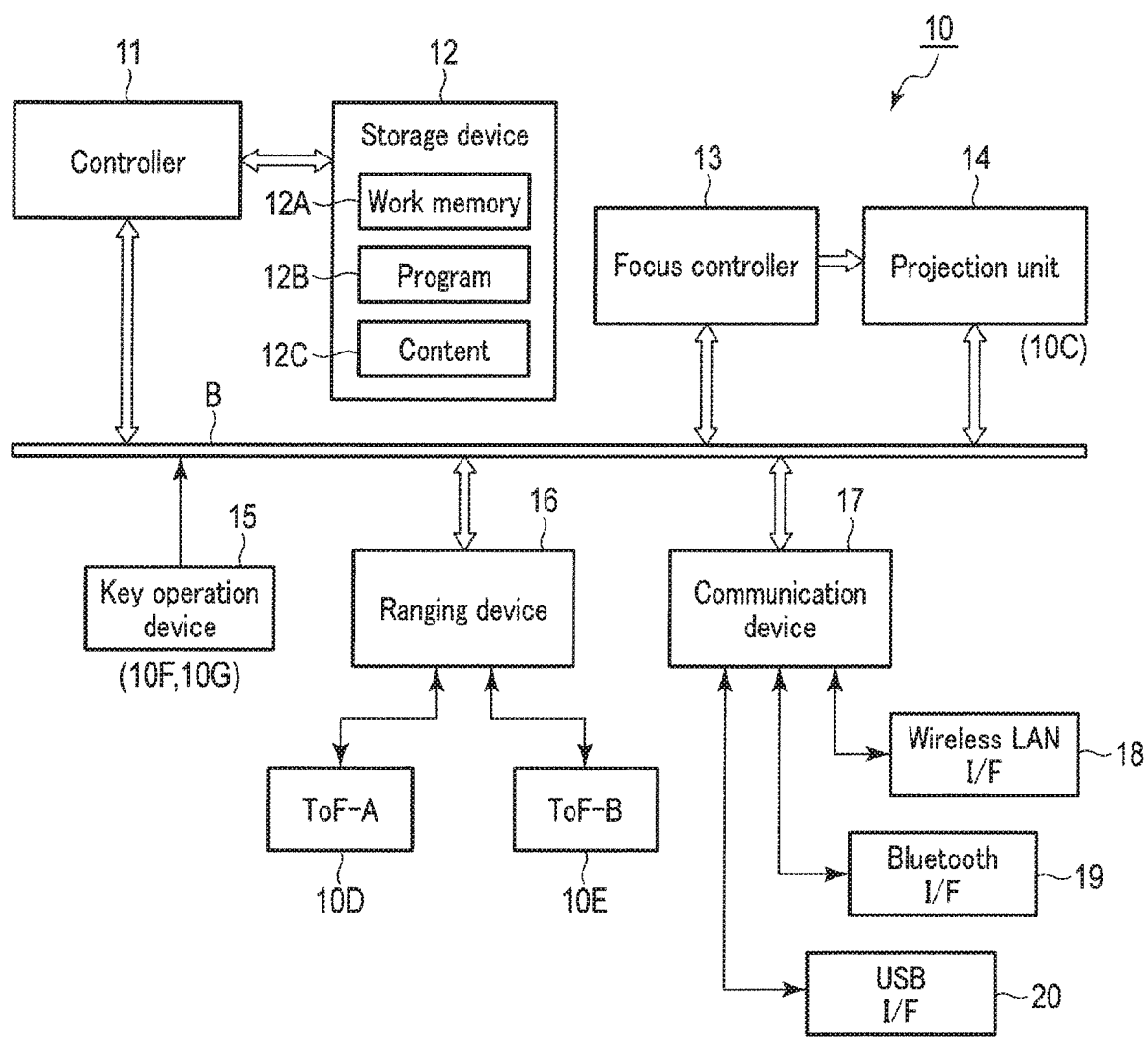
FIG. 3 is a block diagram illustrating a functional configuration of electronic circuitry according to the embodiment of the invention.

FIG. 3 is a block diagram illustrating a functional configuration of electronic circuitry provided in the small-sized mobile projector 10. In FIG. 3, a storage device 12 is directly connected to a controller 11 which executes overall control of the small-sized mobile projector 10. In addition, a focus processor 13, a projection unit 14, a key operation device 15, a ranging device 16 and a communication device 17 are connected to the controller 11 via a bus B.

The storage device 12 includes a work memory 12A composed of a RAM; a program memory 12B composed of a nonvolatile memory such as a flash ROM; and a content memory 12C.

The controller 11 is composed of a processor such as a CPU. The controller 11 reads out an operation program stored in the program memory 12B, loads the operation program in the work memory 12A and executes the operation program, thereby controlling the projection operation in the small-sized mobile projector 10.

The projection unit 14 includes, in addition to the above-described projection lens unit 10C, a light source composed of a semiconductor light-emitting element (not shown), and micromirror element that is a display element. The projection unit 14 forms an optical image by using image content stored in the content memory 12C, and emits and projects the optical image by the projection lens unit 10C.

The focus processor 13 drives and controls, under the control of the controller 11, the position of a focus lens (not shown) in the projection lens unit 10C.

The key operation device 15 includes the focus dial 10F and power key 10G, and sends operation signals corresponding to the operations of the focus dial 10F and power key 10G to the controller 11.

The ranging device 16 drives the ToF sensors 10D and 10E at predetermined sampling cycles of, e.g. 0.2 [millisecond] to 0.35 [millisecond] (sampling frequency: about 2850 [Hz] to 5000 [Hz]), acquires distance data from the detection outputs of the ToF sensors 10D and 10E, and sends the acquired distance data to the controller 11.

The communication device 17 controls transmission/reception of data to/from a device which is externally connected by radio or by wire to the small-sized mobile projector 10 via, for example, a wireless LAN interface (I/F) 18, a Bluetooth (trademark) interface (I/F) 19 or a USB interface (I/F) 20.

The wireless LAN interface 18 transmits/receives wireless data to/from an external device according to, e.g. IEEE802.11a/11b/11g/11n standards.

The Bluetooth interface 19 supports, e.g. Bluetooth (trademark) BR/EDR version 5.0, and executes transmission/reception of wireless data, such as image content, with relatively low power consumption.

The USB interface 20 executes transmission/reception of data, such as image content, to/from an external device which is connected via a USB cable (not shown).

Next, the operation of the above-described embodiment will be described.

FIG. 4 is a flowchart illustrating the processing content corresponding to the gesture operation of the user, which the controller 11 mainly executes cyclically.

To start with, in the process, the controller 11 acquires from the focus processor 13 a focal distance f of the presently performed image projection, which corresponds to the operation position of the focus dial 10F (step S101).

Next, the controller 11 acquires the present use state as detection outputs of the ToF sensors 10D and 10E during, mainly, an immediately preceding predetermined time (step S102).

Figure 5A:
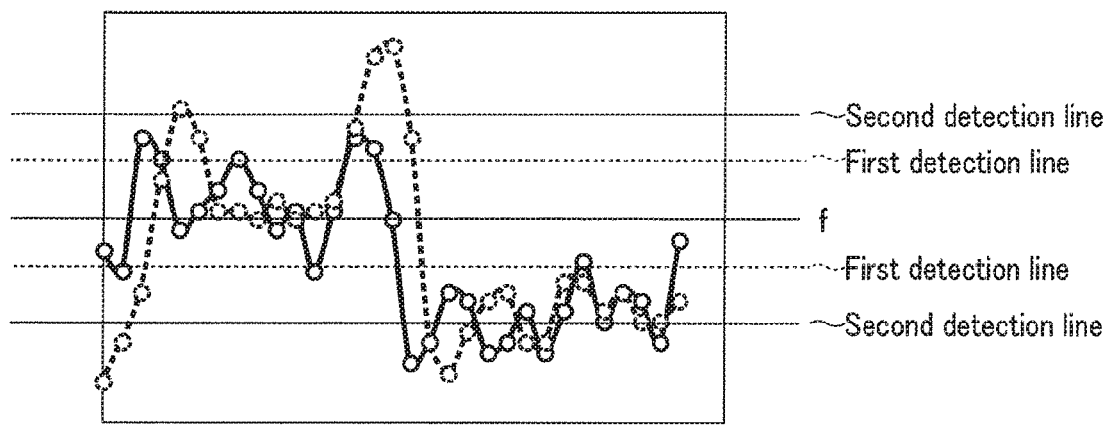
FIG. 5A, FIG. 5B and FIG. 5C are views exemplarily illustrating time-based variation characteristics of detection outputs of ToF (Time of Flight) sensors (ToF-A, ToF-B) according to the embodiment of the invention.
Figure 5B:
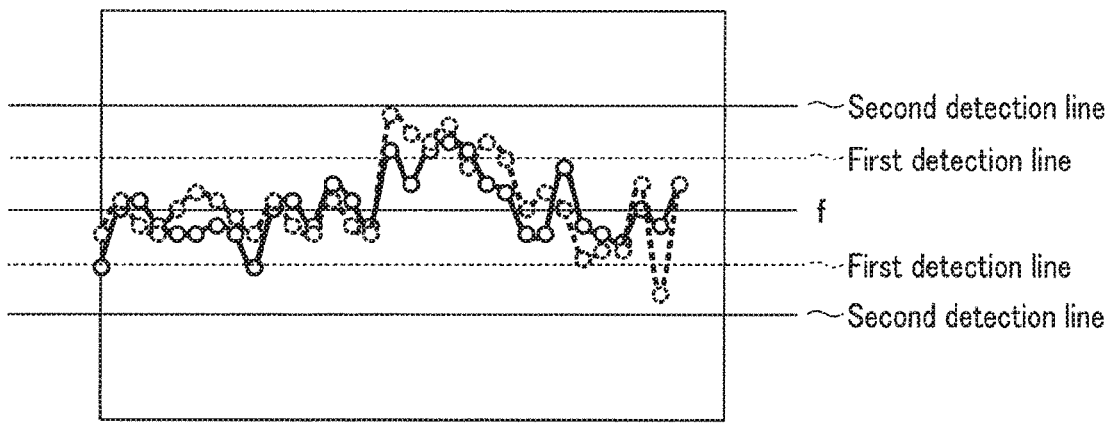
Figure 5C:
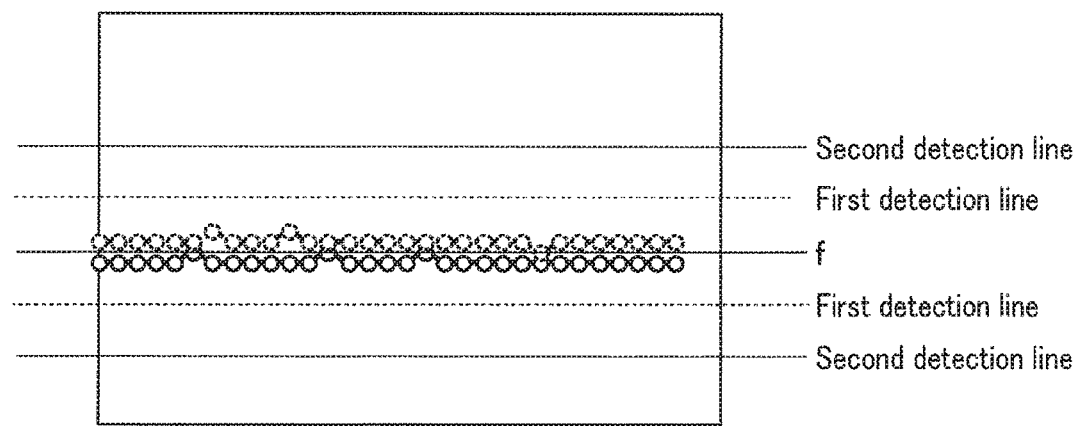

FIG. 5A, FIG. 5B and FIG. 5C are views exemplarily illustrating time-based variation characteristics of detection outputs of ToF sensors ToF-A and ToF-B in the case where the sampling cycle is, for example, 0.3 [millisecond]. In FIG. 5A, FIG. 5B and FIG. 5C, for example, it is assumed that a characteristic graph indicated by a solid line is the output of the ToF sensor 10D (ToF-A), and a characteristic graph indicated by a broken line is the output of the ToF sensor 10E (ToF-B).

It is assumed that the degree of variation during the predetermined time is determined by setting first detection lines and second detection lines as thresholds on the upper and lower sides of the focal distance f as the center.

FIG. 5A exemplarily illustrates the outputs of the ToF sensors 10D and 10E in a state of "Case I" in which both the main body of the small-sized mobile projector 10 and the projection surface are being shaken, for example, as in the case where the small-sized mobile projector 10 is worn on the breast pocket PK of the shirt ST as illustrated in FIG. 1C, and the user's hand HD is used as the projection surface.

The controller 11 counts the number of times by which the detection outputs exceed the second detection lines of the thresholds with greater deviations from the focal distance f during the predetermined time, and determines the "Case I" state.

FIG. 5B exemplarily illustrates the outputs of the ToF sensors 10D and 10E in a state of "Case II" in which only the main body of the small-sized mobile projector 10 is being shaken, for example, as in the case where the small-sized mobile projector 10 is worn on the breast pocket PK of the shirt ST as illustrated in FIG. 1C, and a fixed projection target, such as a wall surface, is used as the projection surface.

When the detection outputs do not exceed the second detection lines of the thresholds with greater deviations from the focal distance f during the predetermined time but the detection outputs exceed the first detection lines of the thresholds with less deviations from the focal distance f during the predetermined time, the controller 11 counts the number of times by which the detection outputs exceed the first detection lines and determines the "Case II" state.

FIG. 5C exemplarily illustrates the outputs of the ToF sensors 10D and 10E in a state of "Case III" in which both the small-sized mobile projector 10 and the projection surface are fixed, for example, as in the case where the small-sized mobile projector 10 is fixed by a tripod or the like, and a fixed projection target, such as a wall surface, is used as the projection surface.

Since the detection outputs exceed neither the second detection lines of the thresholds with greater deviations from the focal distance f during the predetermined time nor the first detection lines of the thresholds with less deviations, the controller 11 determines the "Case III" state.

In step S102, the controller 11 acquires the detection outputs of the ToF sensors 10D and 10E as the present use state, and then determines which of "Case I", "Case II", "Case III", "Narrow Place" and "No Projection" corresponds to the use state, based on the detection outputs of the ToF sensors 10D and 10E during the immediately preceding predetermined time (step S103).

When the use state is determined to be "Case I", the controller 11 then selects a gesture determination table corresponding to a "palm projection mode" (step S105).

FIG. 6A and FIG. 6B are views for describing a projection environment and a gesture determination content in the "palm projection mode". As illustrated in FIG. 6A, the focal distance f is found in accordance with the operation position of the focus dial 10F. In this case, as illustrated in FIG. 6A, the projection surface is located on the palm.

With reference to the focal distance f, the following four areas are divided in accordance with the distance from the small-sized mobile projector 10:
area 3: 0 or more, and a (=f−0.30f) or less,
area 2: a (=f−0.30f) or more, and b (=f+0.30f) or less,
area 1: b (=f+0.30f) or more, and c (=f+0.5f) or less, and
area 0: c (=f+0.5f) or more.

The controller 11 reads out the gesture determination table in the palm projection mode from the program memory 12B, as illustrated in FIG. 6B, sets the gesture determination table on the work memory 12A, and prepares for a subsequent gesture operation.

Specifically, seven kinds of gesture operations are detected here, from the transition states of the position of the user's hand, which are obtained from the detection outputs of the ToF sensors 10D and 10E. In this table, for example, a set of values of area 3 to area 0, which are obtained from the outputs of the ToF sensors 10D and 10E, are determined like (x, y). A variable N (=1~3) in the table is indicative of any one of positions of area 1 to area 3, excluding area 0.

For example, in a viewer mode for viewing image files stored in the content memory 12C that is the internal storage medium, if a second gesture command "Down" is detected while a file "Image001" in the series of image files is being projected, an immediately preceding image "Image000" is projected by an operation instruction "SlideBack" that is associated with this gesture.

In this state, if a third gesture command "Up" is detected, the next image "Image001" is projected by an operation instruction "SlideFWD" that is associated with the gesture.

The four basic gesture operations "Up", "Down", "Near" and "Far" illustrated in FIG. 2B may be associated with operation instructions with particularly high frequency of use at the time of image projection. For example, "Near" may be associated with enlargement projection for increasing a projection view angle, and "Far" may be associated with reduction projection for reducing a projection view angle. By this setting, the operability can be further enhanced.

In addition, when the first gesture command "Out" (large movement of the hand to the outside) is associated with an operation instruction "extension of focal distance f", the extension of the focal distance f to a fixed degree can be executed instead of the operation of the focus dial 10F by the detection of this gesture.

Further, in step S103, when the use state is determined to be "Case II", the controller 11 then selects a gesture determination table corresponding to a "wall surface projection mode" (step S106).

FIG. 7 is a view for describing a projection environment in the "wall surface projection mode". In this case, the focal distance f of the projection lens unit 10C is set on or near the surface of a wall WL, as indicated by an actual wall surface in FIG. 7. At positions farther than the focal distance f, which correspond to the depth side of the area 2, area 1 and area 0 in FIG. 6A, the gesture operation by the palm cannot be performed.

Accordingly, in the present embodiment, the reference position of the gesture operation is set on the front side with respect to the focal distance f, for example, at a focal distance f'=f/2, and the control for the gesture operation is controlled.

FIG. 8A and FIG. 8B are views for describing a projection environment and a gesture determination content in the "wall surface projection mode" in the state in which a reference position serving as a substitute is set as described above. As illustrated in FIG. 8A, with reference to a half value f' of the focal distance f corresponding to the operation position of the focus dial 10F, the following four areas are divided in accordance with the distance from the small-sized mobile projector 10:

area 3: 0 or more, and a' (=f'-0.30f') or less,
area 2: a' (=f'-0.30f') or more, and b' (=f'+0.30f') or less,
area 1: b' (=f'+0.30f') or more, and c' (=f'+0.50f') or less, and
area 0: c' (=f'+0.50f') or more, and up to f.

The gesture determination table itself illustrated in FIG. 8B has the same content as illustrated in FIG. 6B.

Besides, in step S103, when the use state is determined to be "Case III", the controller 11 then selects a gesture determination table corresponding to a "static position projection mode" (step S107).

In this "Case III", an installation environment is assumed in which both the small-sized mobile projector 10 and the wall surface of the projection surface are fixed. Thus, as regards the division of areas, like the "Case II" illustrated in FIG. 8A, the areas are divided with reference to the half value f' of the focal distance f, and the gesture is determined.

It is assumed that the content of the gesture determination table after the area division in FIG. 9A is the same as the content of the above-described "palm projection mode" and "wall surface projection mode". Further, in this "static position projection mode", an eighth gesture operation "Tilt-1" and a ninth gesture operation "Tilt-2" are added.

FIG. 9B illustrates the movements of the palm of the gesture operations "Tilt-1" and "Tilt-2". When the plane of the palm perpendicular to the axis of ranging of the ToF sensors 10D and 10E is set at 0°, it is detected that the palm is inclined from less than 45° on the front or rear side to 45° or more toward the front side (Tilt-1) or rear side (Tilt-2).

Specifically, based on the outputs of the ToF sensors 10D and 10E, determination is executed as to whether or not the position of the palm remains unchanged within the area and the difference between the distance values acquired by the ToF sensors 10D and 10E has become a distance value d or more, the distance value d being equal to the interval of arrangement of the two ToF sensors 10D and 10E.

In addition, in step S103, when the use state is determined to be "narrow place", the controller 11 then selects a gesture determination table corresponding to a "narrow place projection mode" (step S108).

Note that, as regards the "narrow place projection mode", a forcible transition may be executed to the "narrow place projection mode" by a specific operation by the user, for example, a one-time operation of the power key 10G for only a fixed short time of 0.2 [second] or less.

FIG. 10A and FIG. 10B are views for describing a projection environment and a gesture determination content in the "narrow place projection mode". As illustrated in FIG. 10A, in the state in which projection is performed on the palm with a very short focal distance f, when there is no large allowance in space for performing a gesture operation due to the presence of the wall WL or the like, an instruction can be given by a small gesture operation by designating the "narrow space projection mode" as described above.

In this case, with reference to the focal distance f, the following four areas are divided in accordance with the distance from the small-sized mobile projector 10:

area 3: 0 or more, and a (=f-0.15f) or less,
area 2: a (=f-0.15f) or more, and b (=f+0.15f) or less,
area 1: b (=f+0.15f) or more, and c (=f+0.25f) or less, and
area 0: c (=f+0.25f) or more.

The controller 11 reads out a gesture determination table in the narrow place projection mode from the program memory 12B, as illustrated in FIG. 10B, sets the gesture determination table on the work memory 12A, and prepares for a subsequent gesture operation.

In addition, in step S103, when the image projection operation is not being executed by the projection unit 14 at the present time point, the use state is determined to be "no projection" unconditionally. Then, the controller 11 provisionally selects a gesture determination table corresponding to the "palm projection mode" (step S104).

In this case, by accepting an instruction by a gesture operation, preparation is made for a transition to the starting of a projection operation with the selection of an image file stored in the content memory 12C or with the setting of an input of an image file from the output via the communication device 17.

If the selection of the gesture determination table is finished by any one of the processes of steps S104 to S108, it is then determined whether or not a command instruction by a gesture operation has actually been given, according to the detection outputs of the ToF sensors 10D and 10E (step S109).

When it is determined that the command instruction by the gesture operation was given (Yes in step S109), the controller 11 determines the gesture command by using the gesture determination table that is selected at that time point, and executes the control on the projection operation, which is based on the determination result (step S110). By the above, the series of processes is once finished, and the controller 11 returns to the process from step S101.

On the other hand, in step S109, based on the detection outputs of the ToF sensors 10D and 10E, when it is determined that no command instruction by a specific gesture operation was given from the state in which the gesture determination table was selected (No in step S109), the controller 11 once finishes the series of processes, without executing the control on the projection operation in step S110. Then, the controller 11 returns to the process from step S101.

As has been described above in detail, according to the present embodiment, at least one pair of ToF sensors with simple structures, which perform ranging only in their axial directions, are used. Thereby, simple gesture operations can be detected. Therefore, various kinds of operations relating to the projection operation can be realized, even with simple configurations.

In addition, in this embodiment, since gesture operations correspond to time-based variations of the detection outputs of the ToF sensors, there are many detectable variations of gesture operations, and more complex operations can be instructed.

Additionally, in the present embodiment, far-side and near-side ranges along the optical axis of projection are divided into areas with reference to the focal distance with which the image is being projected at the present time point, and consideration is given to the gesture operations. Thus, the control by very intuitive gesture operations, which are adapted to the projection environment, can be realized.

Additionally, in the present embodiment, the contents to be accepted as gesture operations are increased or decreased in accordance with the degree of time-based variations of detection outputs of the ToF sensors, for example, when at least one of the projection apparatus and the state of the projection surface is fixed, or both of them are fixed. Therefore, gesture operations, which cannot be determined in an unstable projection environment, can be properly accepted.

In the above-described embodiment, the present invention is applied to the wearable-type small-sized mobile projector which incorporates the memory for content and includes the communication function with an external device. However, the present invention does not restrict the purpose of use of the projection apparatus, the projector method corresponding to the light emission source, display, etc., and the input system of image information that is the object of projection.

Additionally, in the present embodiment, in the small-sized mobile projector 10, the ToF sensor 10D (ToF-A) and ToF sensor 10E (ToF-B) are provided on the outer surface of the housing 10A, with the projection lens unit 10C being interposed. However, the embodiment is not limited to this configuration. The number of ToF sensors may be one, instead of being plural. When only one ToF sensor is provided on the outer surface side of the housing 10A, a plurality of gesture commands to the small-sized mobile projector 10 can be accepted as operation instructions, specifically, a movement (Out) of the user's hand HD to the outside from the vicinity of the focal point, a movement (Near) of the user's hand to the near side, a movement (Far) of the user's hand to the far side, a state (Set) in which the user's hand HD is positioned over the vicinity of the focal point, and a state (Clear) in which the user's hand HD is present in none of the areas 1 to 3 for three seconds or more.

Additionally, an element other than the ToF sensor 10D, 10E may be used as the ranging device. For example, a laser autofocus may be used. In the laser autofocus, an emission hole of a laser beam is provided on the outer surface side of the housing 10A, and a laser beam of weak infrared is applied to a target. By detecting the state of reflection, the distance to the target is measured. Alternatively, use can be made of a method of achieving focusing from information of an image to be captured. Specifically, a phase-difference autofocus, which is based on the following concept, may be used. A separator lens or a phase-difference sensor is provided for autofocus. In the case where an image is correctly focused, when an image is divided into two images by the separator lens that is located behind a sensor for imaging, the positions of the two images become constant. In addition, by utilizing an imaging element for record images, it is possible to use a contrast autofocus which captures a plurality of images by displacing the focus.

Moreover, by arranging two cameras in parallel and by simultaneously performing photography and executing image processing, it is possible to measure a distance by using the stereo camera which acquires depth information of a photographed object. Besides, a distance may be measured by a structured light. In the structured light, a striped or lattice-shaped pattern is projected on an object, and the pattern is photographed by a camera that is disposed at a different angle. Since the projected pattern is distorted by the shape of the object, the shape or depth of the object is found from a pattern of distortion.

In the above-described embodiment, by detecting the subject distance corresponding to the lens position of the manual focus lens (acquisition device), the distance between the small-sized mobile projector 10 (apparatus main body) and the projection object is acquired. However, the embodiment is not limited to this configuration. The acquisition device may acquire a result of ranging of the ranging device which has the axis of ranging that is substantially parallel to the projection optical axis of the projection unit.

Besides, the present invention is not limited to the above-described embodiment, and can be variously modified without departing from the scope of the present invention in practical stages. In addition, the embodiments may be appropriately combined as much as possible and practiced and, in this case, the combined advantageous effects can be obtained. Furthermore, the above-described embodiment incorporates inventions of various stages, and various inventions can be extracted by appropriate combinations of the disclosed constituent elements. For example, even if some constituent elements are omitted from all the constituent elements disclosed in the embodiment, a configuration from which some constituent elements are omitted can be extracted as an invention if the problem described in the specification can be solved and the advantageous effects described in the specification can be obtained.

What is claimed is:

1. A projection apparatus comprising:
   a projection unit configured to project an image;
   an acquisition device configured to acquire a distance between an apparatus main body and a projection target;
   a ranging device including a ranging axis which is substantially parallel to a projection optical axis of the projection unit;
   a controller configured to control a projection operation, based on a result of ranging of the ranging device with reference to the distance acquired by the acquisition device;
   wherein the ranging device includes a plurality of ToF (Time of Flight) sensors which are disposed near the projection unit,
   the controller is configured to control the projection operation by the projection unit, in accordance with a degree of variation of detection outputs of the ToF sensors during a predetermined time,
   the controller is configured to determine a use condition, based on the detection outputs of the ToF sensors during an immediately preceding predetermined time, and configured to select a projection mode corresponding to the determined use condition, and
   the controller is configured to select a gesture determination table corresponding to the projection mode.

2. The projection apparatus of claim 1, wherein the ranging device includes a plurality of ToF (Time of Flight) sensors which are disposed near the projection unit, and the controller is configured to divide a distance range on the projection optical axis into a plurality of distance ranges, with reference to a focal position of the projection unit, and configured to control the projection operation by the projection unit, in accordance with detection outputs of the ToF sensors and the divided distance ranges.

3. The projection apparatus of claim 1, wherein the controller is configured to determine at least one of a state of the projection apparatus and a state of a projection surface, in accordance with the degree of the variation of the detection outputs of the ToF sensors during the predetermined time, and configured to restrict, in accordance with a result of the determining, a subsequent control content of the projection operation corresponding to the detection outputs of the ToF sensors.

4. A projection apparatus comprising:
a projection unit configured to project an image;
an acquisition device configured to acquire a distance between an apparatus main body and a projection target;
a ranging device including a ranging axis which is substantially parallel to a projection optical axis of the projection unit; and
a controller configured to control a projection operation, based on a result of ranging of the ranging device with reference to the distance acquired by the acquisition device;
wherein the ranging device includes a plurality of ToF (Time of Flight) sensors which are disposed near the projection unit,
the controller is configured to divide a distance range on the projection optical axis into a plurality of distance ranges, with reference to a focal position of the projection unit, and configured to control the projection operation by the projection unit, in accordance with detection outputs of the ToF sensors and the divided distance ranges,
the controller is configured to determine a use condition, based on the detection outputs of the ToF sensors during an immediately preceding predetermined time, and configured to select a projection mode corresponding to the determined use condition, and
the controller is configured to select a gesture determination table corresponding to the projection mode.

5. The projection apparatus of claim 2, wherein the controller is configured to determine at least one of a state of the projection apparatus and a state of a projection surface, in accordance with the degree of the variation of the detection outputs of the ToF sensors during the predetermined time, and configured to restrict, in accordance with a result of the determining, a subsequent control content of the projection operation corresponding to the detection outputs of the ToF sensors.

6. The projection apparatus of claim 1, wherein
the projection unit includes a projection lens unit, and
the projection lens unit is disposed between the two ToF sensors.

7. The projection apparatus of claim 4, wherein the controller is configured to determine at least one of a state of the projection apparatus and a state of a projection surface, in accordance with the degree of the variation of the detection outputs of the ToF sensors during the predetermined time, and configured to restrict, in accordance with a result of the determining, a subsequent control content of the projection operation corresponding to the detection outputs of the ToF sensors.

8. The projection apparatus of claim 4, wherein
the projection unit includes a projection lens unit, and
the projection lens unit is disposed between the two ToF sensors.

9. A projection method applied to an apparatus including a projection unit configured to project an image, an acquisition device configured to acquire a distance between an apparatus main body and a projection target, and a ranging device including a ranging axis which is substantially parallel to a projection optical axis of the projection unit and the ranging device further includes a plurality of ToF (Time of Flight) sensors which are disposed near the projection unit, the method comprising:
controlling a projection operation, based on a result of ranging of the ranging device with reference to the distance acquired by the acquisition device;
controlling the projection operation by the projection unit, in accordance with a degree of variation of detection outputs of the ToF sensors during a predetermined time;
determining a use condition, based on the detection outputs of the ToF sensors during an immediately preceding predetermined time, and selecting a projection mode corresponding to the determined condition; and
selecting a gesture determination table corresponding to the projection mode.

10. A non-transitory computer-readable storage medium having a program stored thereon which controls a computer incorporated in an apparatus including a projection unit configured to project an image, an acquisition device configured to acquire a distance between an apparatus main body and a projection target, and a ranging device including a ranging axis which is substantially parallel to a projection optical axis of the projection unit and the ranging device further includes a plurality of ToF (Time of Flight) sensors which are disposed near the projection unit, to perform functions comprising:
controlling a projection operation, based on a result of ranging of the ranging device with reference to the distance acquired by the acquisition device;
controlling the projection operation by the projection unit, in accordance with a degree of variation of detection outputs of the ToF sensors during a predetermined time,
determining a use condition, based on the detection outputs of the ToF sensors during an immediately preceding predetermined time, and configured to select a projection mode corresponding to the determined use condition; and
selecting a gesture determination table corresponding to the projection mode.

* * * * *